Oct. 5, 1943. D. H. TUCK 2,330,935
COMBINED BUILDING WALLS AND LIGHTING EQUIPMENT
Filed Jan. 21, 1942 2 Sheets-Sheet 2
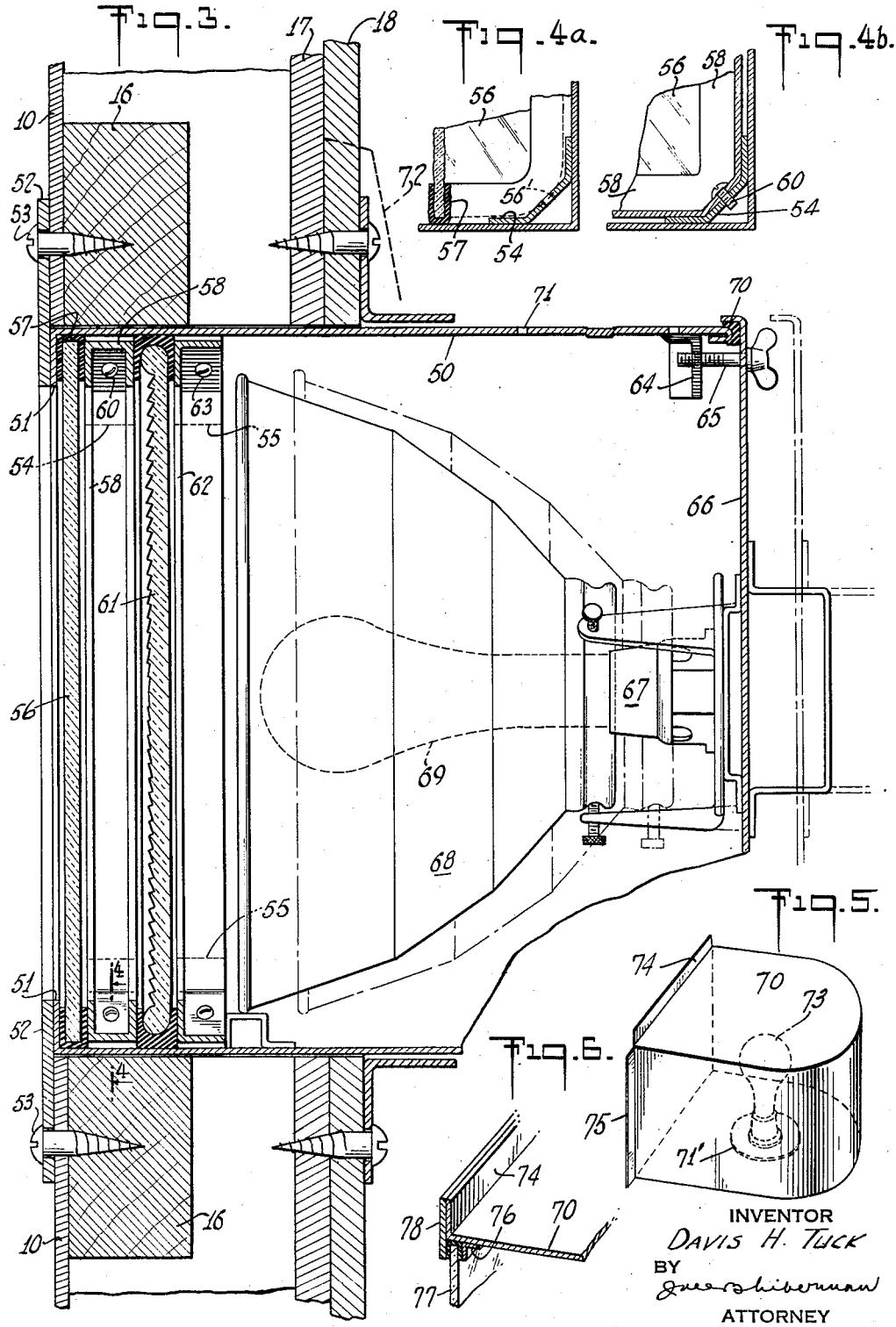
INVENTOR
DAVIS H. TUCK
BY
ATTORNEY Patented Oct. 5, 1943

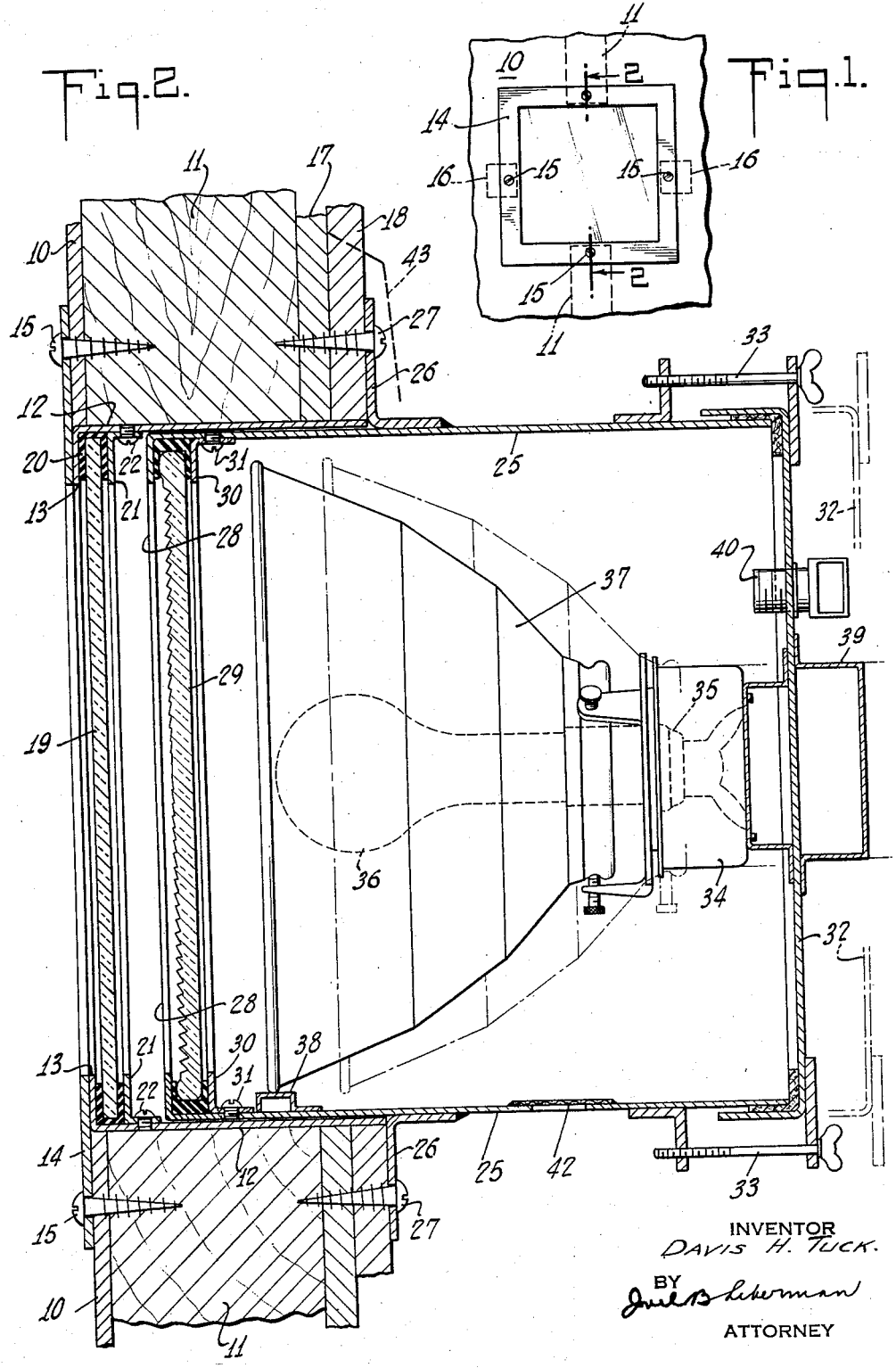

2,330,935

UNITED STATES PATENT OFFICE 2,330,935

COMBINED BUILDING WALLS AND LIGHTING EQUIPMENT

Davis H. Tuck, Redding Ridge, Conn., assignor to Holophane Company, Inc., New York, N. Y., a corporation of Delaware Application January 21, 1942, Serial No. 427,542

4 Claims. (Cl. 240—2)

The present invention relates to combined building walls and lighting equipment, and is more particularly directed toward providing the side wall of a building with lighting equipment which occupies an unfinished opening in the wall of the building and is accessible externally of the building.

In buildings devoted to extremely hazardous processes such as in explosive powder plants it is necessary to have the lighting equipment externally accessible so that all wiring and maintenance work can be attended to outside the building and so that no hazard is introduced into the building by reason of the lighting equipment. According to the ordinary methods of construction these buildings are frame buildings with inner and outer sheathing and wall surfacing and the walls are provided with holes usually well above eye level to accommodate the lighting equipment. Heretofore it has been customary to provide the framed and sheathed building with holes similar to the window openings of an ordinary frame building and to finish or frame in these openings by carpentry constructions similar to those which would ordinarily be used for window or door frame of a wooden building. As numerous pieces of lighting equipment are required for each building the expense of constructing these framed openings is very substantial.

The present invention contemplates forms of lighting equipment which provide all the framing necessary to finish and close the opening in the wall.

The present invention also contemplates lighting equipment in which all the wiring is external of the building, but made readily accessible for inspection and maintenance.

Other and further objects will appear as the description proceeds.

The accompanying drawings show, for purposes of illustrating the present invention, three embodiments in which the invention may take form, it being understood that the drawings are illustrative of the invention rather than limiting the same.

In these drawings:

Figure 1 is a fragmentary elevational view of the inner face of the wall of a building provided with the improved lighting equipment;

Figure 2 is a vertical sectional view on the line 2—2 of Figure 1 showing one form of construction;

Figure 3 is a vertical sectional view similar to Figure 2 showing another form of construction;

Figures 4a and 4b are fragmentary sectional views taken on the line 4—4 of Figure 3 illustrating the position of parts during assembly and after completion of assembly, respectively; and Figures 5 and 6 are fragmentary views illustrating a further modified form of construction.

The inner wall surfacing of a frame building such as would be used in a powder plant is illustrated at 10. This surfacing material will be secured in the usual framing such as studding illustrated at 11. The wall of the building is provided with a rough unfinished hole of a size to receive the lighting equipment, for example, a hole 12½" square. In previous constructions such holes have been made substantially larger than the lighting fixture and have been finished by ordinary methods of carpentry to provide a framed opening in the wall.

As shown in Figure 2 the unfinished opening in the wall of the building is closed by a rectangular liner 12, flanged on its inner face as indicated at 13. This liner is welded or otherwise secured to a finishing plate 14 which may be secured to the inner face of the wall by screws indicated at 15. This plate is thin and presents a minimum surface for the accumulation of dust. These screws may be passed into the studding 11, or into blocks of wood as indicated at 16.

The outside of the building is covered with sheathing 17 and clapboards or other finishing as indicated at 18. The depth of the liner 12 is such as to bring it out substantially to the outer face of the outer surfacing of the material 18 of the building wall. The liner 12 carries a light transmitting plate 19 preferably made of tempered glass and permanently sealed in place by suitable gasket material indicated at 20. The gasket material and plate are held in place by angle bars 21 secured in place by screws 22.

A box or housing 25 is received in the liner 12 and adapted to be secured in fixed position by brackets 26 and screws 27. The inner end of the box or housing 25 is flanged inwardly, as indicated at 28, and supports a suitably gasketed prismatic lens plate 29, the latter being held in place by angle bars 30 and screws 31.

The outer end of the box is provided with a gasketed cover 32 adapted to be held in place by external bolts 33. This cover member carries an outlet box 34, lamp socket 35, lamp 36 and reflector 37. As these devices are usually mounted in a vertical wall with the axis of the optical system horizontal, the box 25 is preferably provided with a supporter 38 for the lower inner end of the reflector. The box cover 32 is provided with a handle 39 and is here shown as having a conduit fitting 40 to carry the wiring into the outlet box. The box is provided with a suitable screened drainage opening 42 at the bottom which also provides ventilation, and flashing 43 may be employed about the wall opening.

In the form of construction shown in Figures 3, 4a and 4b, the inner wall surfacing 10, sheathing 17 and external finishing 18 may be the same as before and the hole cut in the wall is provided with no finishing, except that which comes from the use of the lighting equipment.

In Figure 3 the housing or box 50 is inwardly flanged at the inner end, as indicated at 51, and this flange is welded or otherwise secured to a finishing plate 52. Across each of the corners of the box 50 are welded corner pieces 54 and 55, these being adapted to receive screws as indicated. A transparent glass plate 56, similar to the plate 19, may have rounded corners, as indicated at 56' in Figure 4a, to facilitate passing it in by the corner pieces. Suitable gasket material is provided, as indicated at 57, and channel shaped members 58 are passed down against the gasket material and inside the corner pieces. They are held in place by screws 60 threaded into the holes in the corner pieces 54. These plates 58 are of U-shaped cross section in order to provide an abutment for a lens 61, which is held in place by retaining devices 62 of L-shaped cross section secured to the corner pieces 55 by screws 63. It will be noted that the screws 60 and 63 pass out towards the corners of the box but that no drilling of the box is necessary and no screws protrude beyond the box so that there is nothing on the outside of the box to interfere with passing it outwardly through the hole in the wall to bring flange 52 against surfacing 10, where it may be secured by screws 53.

The rear of the box 50 is provided with interiorly disposed corner pieces 64 adapted to receive bolts 65. These bolts pass through a cover 66 which supports the lamp socket 67, reflector 68 and lamp 69 as indicated.

The device is made weathertight by suitable gasket material 70. Openings indicated at 71 are provided for securing a weatherproof wiring fixture in place and flashing material 72 may be provided.

In Figures 5 and 6 a simplified form of construction is shown in which the housing 70 is provided with a wiring inlet (not shown) and has a removable plate 71' carrying the lamp 73. For convenience the plate 71' is placed in the bottom of the housing. The inner end of the housing is flanged outwardly, as indicated at 74 and 75, to fit against the inner wall surfacing of the building. Angles 76 are placed inside the housing a slight distance back of the flanges so that a glass plate 77 may be inserted. This plate with gasket material is held in place by a plate 78. The inside of the box will be painted white. This type of unit makes it unnecessary to provide a finished wall opening.

From the above it will be apparent that the fixture does not extend into the interior of the building and that all wiring is external of the building and that all maintenance of the fixture, such as relamping and cleaning, is carried on outside of the building. In the preferred form of construction the light source is associated with the reflector and lens to secure a predetermined light distribution. Where round or elongated optical equipment is employed it may be placed in a square or rectangular box, or a cylindrical box may be used with annular equipment.

Since it is obvious that the invention may be embodied in other forms and constructions within the scope of the claims, I wish it to be understood that the particular forms shown are but a few of these forms, and various modifications and changes being possible, I do not otherwise limit myself in any way with respect thereto.

What is claimed is:

1. In combination, a frame building adapted for the carrying out of manufacturing operations wherein the air is laden with explosive dust and having an exterior vertical side wall provided with an inner and an outer surfacing, and an untrimmed, unfinished opening extending through both surfacings, a finishing plate having an aperture smaller than the opening and secured to the inner face of the inner surfacing to provide interior trim about the wall opening, the plate being thin so as to present a minimum area for the accumulation of dust, a light transmitting panel secured closely behind the finishing plate so as to provide a glazing for the opening, a metal housing fitting the wall opening extending from the inner surfacing of the wall through the wall opening to protrude beyond the outer surfacing and be partly external of the wall, the housing being permanently secured to the finishing plate and when in place concealing the entire unfinished opening from observation through the panel, a cover for the exposed end of the housing, an inwardly opening lamp socket carried by the cover, a lamp in the socket, a cover supported reflector about the lamp, and current supply connections leading to an externally exposed portion of the housing, the housing and cover providing a totally enclosed luminaire and being weather proofed, the cover, reflector and lamp being removable as a unit without entering the building or disturbing the securement of the housing in the building wall.

2. The combination claimed in claim 1, wherein the housing fixedly supports a light directing lens between the panel and the reflector mouth.

3. In a lighting fixture, a rectangular box, an inwardly extending flange at one end, corner pieces secured to the box walls behind the flange and extending diagonally across the corners of the box, a rectangular light transmitting plate of slightly smaller dimension than the inside of the box and whose corners are cut away to permit the plate to pass by the corner pieces toward the flange, gasket material about the edges of the plate, a rectangular plate retainer of L-shaped cross section fitting inside the corner members and having one side engaging the gasket material and the other side opposite the corner members, and screws passing through the retainer and corner pieces.

4. In a lighting fixture, a sheet metal box having walls at right angles to one another to form corners, an inwardly extending abutment carried by each wall, a light transmitting panel having one face fitting the abutments, corner straps, each having an end portion secured to the walls forming a corner at a distance from the intersection and a mid portion extending across the corner over the face of the panel remote from the abutment, and a panel retainer across the other face of the panel secured to each strap by a screw passing through the mid portions of the strap and terminating inside the box.

DAVIS H. TUCK.